US011959325B2

(12) United States Patent
Matthews et al.

(10) Patent No.: US 11,959,325 B2
(45) Date of Patent: Apr. 16, 2024

(54) TRACK- OR RAIL-MOUNTED CLOSURE DRIVE ASSEMBLY

(71) Applicant: Automatic Technology (Australia) Pty Ltd, Keysborough (AU)

(72) Inventors: George Matthews, Keysborough (AU); Raymond Hawkins, Keysborough (AU)

(73) Assignee: Automatic Technology (Australia) Pty Ltd (AU)

( * ) Notice: Subject to any disclaimer, the term of this patent is extended or adjusted under 35 U.S.C. 154(b) by 0 days.

(21) Appl. No.: 17/960,858

(22) Filed: Oct. 6, 2022

(65) Prior Publication Data

US 2023/0045412 A1 Feb. 9, 2023

Related U.S. Application Data

(63) Continuation of application No. 16/973,807, filed as application No. PCT/AU2019/050632 on Jun. 20, 2019, now Pat. No. 11,505,982.

(30) Foreign Application Priority Data

Jun. 20, 2018 (AU) ................................ 2018902204

(51) Int. Cl.
*E05F 15/681* (2015.01)
*E05F 15/668* (2015.01)
(Continued)

(52) U.S. Cl.
CPC .......... *E05F 15/681* (2015.01); *E05F 15/668* (2015.01); *E06B 3/485* (2013.01); *E06B 9/74* (2013.01); *E05Y 2201/214* (2013.01)

(58) Field of Classification Search
CPC ........ E06B 9/74; E05F 15/668; E05F 15/686; E05F 15/684; E05F 15/681; E05F 15/678;
(Continued)

(56) References Cited

U.S. PATENT DOCUMENTS 3,909,980 A 10/1975 Courtney et al.
4,344,252 A * 8/1982 Suzuki .................. E05F 15/668 318/266
(Continued)

FOREIGN PATENT DOCUMENTS

DE 19635153 11/1997
WO WO-2007011244 A1 * 1/2007 ............... E06B 9/68
(Continued)

OTHER PUBLICATIONS

Automatic Technology (Australia) Pty Ltd; Extended European Search Report for application No. 19822330.7, dated Mar. 21, 2022, 10 pgs.
(Continued)

*Primary Examiner* — Justin B Rephann
(74) *Attorney, Agent, or Firm* — Taylor English Duma LLP

(57) ABSTRACT

A device for a track- or rail-mounted closure drive assembly can include a lever and cam arrangement configured to drive an engagement member between an engaged position and a disengaged position, the engaged position allowing motor drive of a closure and the disengaged position disconnecting the drive from the motor to the closure; and a rotating body including one or more camming surfaces and one or more peripheral surfaces, the peripheral surfaces including visual indicia to indicate to a user an orientation of the one or more camming surfaces and hence whether the engagement member is in the engaged position or the disengaged position.

20 Claims, 11 Drawing Sheets

(51) Int. Cl.
*E06B 3/48* (2006.01)
*E06B 9/74* (2006.01)

(58) Field of Classification Search
CPC ....... E05F 15/673; E05F 15/676; E05F 15/67; E05Y 2900/106; E05Y 2201/244; E05Y 2201/214
See application file for complete search history.

(56) References Cited

U.S. PATENT DOCUMENTS

| | | | | |
|---|---|---|---|---|
| 4,472,910 | A * | 9/1984 | Iha | E05F 15/668 74/625 |
| 4,628,636 | A | 12/1986 | Folger | |
| 4,905,542 | A * | 3/1990 | Burm | E05F 15/668 74/625 |
| 5,222,403 | A | 6/1993 | Angelini et al. | |
| 6,027,148 | A * | 2/2000 | Shoemaker | E05B 65/0021 292/201 |
| 6,089,626 | A * | 7/2000 | Shoemaker | E05B 65/0021 292/201 |
| 6,273,174 | B1 | 8/2001 | Singleton | |
| 6,381,903 | B1 * | 5/2002 | Desrochers | E06B 9/74 160/310 |
| 6,557,301 | B1 * | 5/2003 | Hormann | E05B 65/0021 49/139 |
| 6,860,065 | B2 * | 3/2005 | Griffin | E05F 15/668 49/25 |
| 7,076,917 | B2 | 7/2006 | Chang | |
| 7,240,582 | B1 | 7/2007 | Manaras et al. | |
| 8,403,022 | B2 | 3/2013 | Womacks | |
| 8,453,706 | B2 | 6/2013 | Shepherd et al. | |
| 8,578,653 | B2 | 11/2013 | Hawkins et al. | |
| 8,936,064 | B1 | 1/2015 | Diaz | |
| 9,382,728 | B1 | 7/2016 | Wiliams | |
| 9,512,639 | B2 | 12/2016 | Schulte et al. | |
| 11,505,982 | B2 | 11/2022 | Matthews et al. | |
| 2003/0208961 | A1 | 11/2003 | Griffin et al. | |
| 2004/0211279 | A1 * | 10/2004 | Walravens | E05F 15/603 74/417 |
| 2010/0024308 | A1 * | 2/2010 | Coubray | E05F 15/67 49/362 |
| 2010/0325965 | A1 | 12/2010 | Hawkins et al. | |
| 2012/0019011 | A1 | 1/2012 | Laborde | |
| 2013/0140130 | A1 * | 6/2013 | Dang | E06B 9/74 192/93 A |
| 2021/0131162 | A1 | 5/2021 | Matthews et al. | |

FOREIGN PATENT DOCUMENTS

| | | |
|---|---|---|
| WO | 2017205931 | 12/2017 |
| WO | 2019241841 | 12/2019 |

OTHER PUBLICATIONS

Matthews, George; Applicant-Initiated Interview Summary for U.S. Appl. No. 16/973,807, filed Dec. 10, 2020, dated Jun. 21, 2022, 2 pgs.
Matthews, George; International Search Report and Written Opinion for PCT/AU2019/050632, filed Jun. 20, 2019, dated Aug. 29, 2019, 14 pgs.
Matthews, George; Non-Final Office Action for U.S. Appl. No. 16/973,807, filed Dec. 10, 2020, dated Mar. 18, 2022, 12 pgs.
Matthews, George; Notice of Allowance for U.S. Appl. No. 16/973,807, filed Dec. 10, 2020, dated Jul. 7, 2022, 11 pgs.

* cited by examiner

SECTION B-B

SECTION C-C

TRACK- OR RAIL-MOUNTED CLOSURE DRIVE ASSEMBLY

REFERENCE TO RELATED APPLICATIONS

The application is a continuation of U.S. application Ser. No. 16/973,807, which entered the national stage in the United States on Dec. 10, 2020, and was filed as PCT Application No. PCT/AU2019/050632 on Jun. 20, 2019, which claims priority to Australian Patent Application No. 2018902204, filed Jun. 20, 2018, each of which is hereby specifically incorporated by reference herein in its entirety.

FIELD OF THE INVENTION

The invention relates to a track- or rail-mounted closure drive assembly, to a device for such an assembly for selectively engaging with a closure drive means, and to a closure assembly including a closure mounted to move between an open and a closed position.

BACKGROUND TO THE INVENTION

In this specification, where a document, act or item of knowledge is referred to or discussed, the reference or discussion is not an admission that the document, act or item of knowledge or any combination thereof was at the priority date part of common general knowledge, or known to be relevant to an attempt to solve any problem with which this specification is concerned.

Longitudinal drive means such as flexible drive belts are commonly used in drive assemblies for closures such as doors, gates or barriers. References herein to a belt are to be taken to contemplate other type of longitudinal drive means, such as chains or cables. In such assemblies, the drive belt is generally arranged in a closed loop between an idler sprocket and a drive sprocket, the drive sprocket driven by an electric motor under control of an electronic controller. A trolley or carriage is connected to the drive belt to be driven along or within a longitudinal rail or track, e.g., an overhead rail or track mounted to a garage ceiling. The trolley or carriage is attached by a suitable linkage to the closure in order to move it between open and closed positions.

In a device of this sort, the trolley or carriage may be selectively disconnected from the drive belt for maintenance or replacement. Furthermore, selective disconnection of the trolley or carriage from the drive belt allows for manual operation of the closure by a user, required in situations such as in the case of a power failure.

To selectively disconnect the trolley or carriage from the drive belt, it is common to provide a pull cord for manipulation by the user to rotate a lever or other mechanism that in turn releases a part of the trolley or carriage from the drive belt. However, some known mechanisms can be unreliable in respect of ready engagement and disengagement between the trolley or carriage with the drive belt. Furthermore, it can be difficult for a user to easily determine whether the trolley or carriage is engaged or disengaged with the chain or drive belt. This is inconvenient for users and may lead to a situation where the trolley or carriage is inadvertently left disengaged, creating a security risk from potential intruders.

In addition, pull cords can create a security risk, as potential intruders may be able to access the pull cord from outside the closure, typically using a piece of shaped wire or similar tool pushed through the gap between the closure and its surrounding structure. This is not ideal and raises obvious safety concerns with regard to unauthorised access.

Solutions to one or more of the problems noted above have been proposed in the past, examples including those described in U.S. Pat. Nos. 9,382,728; 8,936,064; 6,273,174; 8,403,022; 8,453,706; 9,512,639 and US published patent application no. 2012/0019011, but have not necessarily proved effective or gained wide adoption.

SUMMARY OF THE INVENTION

In one aspect, the invention provides a device for a track- or rail-mounted closure drive assembly, the device including:

- a moveable trolley associated with a closure, the trolley configured for movement along the track or rail under drive by a drive component to move the closure between an open and a closed position, the trolley including a body having a guiding surface;
- a rotating body having one or more camming surfaces, movement of the rotating body being supported by the guiding surface; and
- a lever having a lever camming surface configured to engage with one or more of the camming surfaces of the rotating body,
- wherein the lever is associated with an engagement member such that rotation of the lever moves the lever camming surface along the one or more rotating body camming surfaces to move the engagement member,
- and wherein the engagement member is arranged to provide selective engagement between the moveable trolley and the drive component.

In a preferred form, the lever is arranged to rotate about said rotation axis by application of a specific user action, the lever engagement member is arranged to move between two alternative positions to afford, respectively, engagement and disengagement between the moveable trolley and the drive component, and successive applications of said specific user action results in the rotating body moving the engagement member between the two alternative positions.

Accordingly, rotating the lever to move the lever camming surface along the one or more camming surfaces of the rotating body results in the rotating body moving the engagement member between different positions without the need for different actions of movement.

That is, the engagement member can be moved, with substantially the same lever action, from a first position engaged with said drive component to a second position disengaged with said drive component, and vice versa. This assists in avoiding consumer frustration when different actions are required for engagement and disengagement. In addition, as discussed further below, the rotating body assists in improving security of the device.

As will be understood, the interengagement between the three components (namely the trolley body with its guiding surface, the rotating body and the lever with its lever camming) affords the function of the device of the invention.

Movement of the engagement member is preferably along the axis of rotation of the rotating body.

Preferably, the one or more camming surfaces include one or more engagement setting surfaces whose engagement with the lever camming surface serves to place or hold the engagement member in the engaged position. The one or more camming surfaces may also include one or more disengagement setting surfaces whose engagement with the lever camming surface serves to place or hold the engagement member in the disengaged position.

The engagement setting surfaces and/or the disengagement setting surfaces may have an angular extension of approximately one quarter of the rotating body. The rotating body may thus include respective engagement setting surfaces and/or disengagement setting surfaces located on diametrically opposing sides of the rotating body. The engagement and disengagement setting surfaces may thus alternate around the rotating body camming surface(s).

In an embodiment, a visual indicator is associated with the one or more engagement setting surfaces and/or the one or more disengagement setting surfaces to provide a visual indication of whether the engagement member is engaged or disengaged with the drive component. The visual indicator may be provided on the rotating body, and the association between the visual indicator and an engagement/disengagement setting surface may be with respect to angular position around the rotating body.

In one embodiment, the one or more engagement setting surfaces include a lower surface, an inclined surface and an upper surface. The inclined surface connects the lower and upper surfaces. These surfaces may extend in an arcuate manner around the rotating body.

Preferably, the one or more disengagement setting surfaces include one or more offset setting surfaces, whose engagement with the lever camming surface(s) serves to maintain the engagement member in a disengaged position.

The camming surfaces of the rotating body may include camming surfaces configured to engage with the trolley body guiding surface. Preferably, these surfaces are located on one side of the rotating body whilst the camming surfaces configured to engage with the lever camming surface are located on the opposite side of the rotating body.

The camming surfaces of the rotating body configured to engage with the trolley body guiding surface may include one or more inclined body surfaces. Each inclined body surface may be angularly offset relative to the inclined surface of the rotating body engagement setting surfaces. The inclined body surface(s) may be inclined at a different angle to the inclined surface(s) of the rotating body engagement setting surfaces.

Preferably, the guiding surface of the trolley body includes one or more inclined surfaces configured to engage with the one or more inclined body surfaces.

Preferably, the lever camming surface includes one or more inclined lever surface(s), configured to engage with the inclined surface(s) of the rotating body engagement setting surfaces.

Preferably, the device includes a resilient means to bias the various interacting surfaces together.

In a preferred form, the device includes lever bias means, such that when the lever is rotated it is biased back to a rest position. The trolley may include a stop to define the lever rest position. The resilient means to drive the interacting surfaces together and the lever bias means may be provided by a single coil spring.

As will be understood, the preferred mechanism (by way of the arrangement of respective guiding and camming surfaces of its components) involves an operation in which the rotating body can only ever rotate in one direction, while the lever reciprocates between two positions in order to advance rotation of the rotating body.

Preferably, the device is configured such that the lever rotates in a direction substantially away from a closure. In particular, in order to effect actuation of the engagement member from the engaged position to the disengaged position (and vice versa) and maintenance in that position once the lever has been released, it is necessary to complete movement of the lever in a direction with a component of movement substantially away from the closure.

In a further aspect, the invention provides a device for a track- or rail-mounted closure drive assembly, the device including:

- a moveable trolley associated with a closure, the trolley configured for movement along the track or rail under drive by a drive component to move the closure between an open and a closed position;
- an engagement member arranged to provide selective engagement between the trolley and the drive component;
- a support body on the trolley having a throughbore for movement of the engagement member, the throughbore having an axis, the body further having an indexed ratchet guiding surface arranged around the throughbore and comprising an angularly spaced succession of ramp and stop portions;
- a rotating body arranged for rotation about said axis and having a throughbore for movement of the engagement member, the body having on one side an engagement surface comprising an angularly spaced succession of ramp and stop portions complementary to the indexed ratchet guiding surface of the support body, and having on the other side a camming surface comprising an angularly spaced succession of ramp and stop portions; and
- a lever arranged for rotation about said axis, the lever having a lever camming surface comprising an angularly spaced succession of ramp and stop portions configured for cooperation with the camming surface of the rotating body,
- wherein the camming surface and lever camming surface are configured such that rotation of the lever from a rest position through a prescribed angle moves the lever camming surface into a position where one or more stop portions of the lever camming surface engage with one or more stop portions of the rotating body camming surface, and rotation of the lever back to the rest position rotates the rotating body with respect to the support body such that one or more stop portions of the rotating body engagement surface move to engage the next successive stop portion(s) of the indexed ratchet guiding surface,
- wherein the rotating body camming surface and/or the lever camming surface include one or more offset surfaces, configured such that each successive rotation of the lever through said prescribed angle and back to the rest position results in an adjustment of the separation of the lever and the support body in the axial direction,
- and wherein the engagement member is associated with the lever such that the position of the engagement member is determined by the separation of the lever and the support body in the axial direction.

Preferably, the device includes a resilient means to bias the lever and the rotating body towards the support body together in the axial direction.

In a preferred form, the device includes lever bias means, such that when the lever is rotated it is biased back to a rest position. The trolley preferably includes a stop to define the lever rest position.

The resilient means to bias the lever and the rotating body towards the support body and the lever bias means may be provided by a single coil spring.

In a preferred form, the device of any of the aforementioned aspects of the invention includes a latch for latching the trolley to the track or rail, the latch moveable between a latched and an unlatched position, the latch actuated by rotation of the rotating body.

In this way, the latch may be arranged to automatically move into the unlatched position when the engagement member releases the engagement between the trolley and the drive component, to allow movement of the trolley along the rack or rail without operation of the drive component.

Preferably, said latch comprises a lever mounted for pivoting movement around a lever axis on said trolley, the lever axis preferably being substantially horizontal. Preferably, the lever includes a hook portion to engage, when the latch is in its latched position, with a latch stop on or mounted to the track or rail.

Preferably, the latch is biased into its latched state, e.g., by means of a spring, such as a torsion spring arranged around said pivot axis.

Preferably, the circumferential surface of the rotating body provides a cam surface, and a part of the latch provides a complementary follower, such that rotation of the rotating body drives the latch between said latched and unlatched position.

Preferably, said latch is arranged to automatically move into its unlatched position when the drive component is operated to move the trolley along the track or rail. To this end, the drive component may include an element which, when the drive means is operated and the latch is in its latched position, interacts with a part of the latch means to move the into its unlatched position, irrespective of any movement of the rotating body.

In this way, the latch is arranged for automatic release when the trolley and drive component are mutually engaged and the trolley is driven by the drive component to drive the closure.

Preferably, the engagement between the engagement member and the drive component includes a lost motion arrangement, to allow limited movement of the drive component relative to the trolley, resulting in movement of the latch into its unlatched position, before further movement of the drive component causes movement of the trolley along the track or rail. This lost motion arrangement may be provided by the engagement member carried by the trolley engaging with an oversize recess (e.g., a long slot) in a part of the drive component.

In another aspect, the invention provides a device for a closure drive assembly having a lever and cam arrangement to drive an engagement member between an engaged position and a disengaged position, the engaged position allowing motor drive of a closure and the disengaged position disconnecting the drive from the motor to the closure, the assembly for installation in a position relative to a closure operated by said closure drive assembly, having a user actuation means attached to the lever, such that pulling of the user actuation means in a generally downward direction drives the engagement member between the engaged and disengaged positions, the assembly configured such that the disengaged position can only be realised if the generally downward force on the user actuation means includes a substantial component of force in a direction away from the closure.

Preferably, the user actuation means is arranged such that successive pulling of the user actuation means in a generally downward direction from a start position over a prescribed distance and release of the user actuation means to return under a resilient force substantially to said start position results in the engagement member alternating between said engaged position and said disengaged position, and the assembly is configured such that the alternation between said engaged and disengaged positions is only realised if the generally downward force on the user actuation means includes a component of force substantially in a direction away from the closure.

In a further aspect, the invention provides an engagement/disengagement device for a track- or rail-mounted closure drive assembly, the device including a lever and cam arrangement to drive an engagement member between an engaged position and a disengaged position, the engaged position allowing motor drive of a closure and the disengaged position disconnecting the drive from the motor to the closure, the device including a rotating body including one or more camming surfaces and one or more peripheral surfaces, the peripheral surfaces including visual indicia to indicate to a user the orientation of the one or more camming surfaces and hence whether the engagement member is in the engaged or disengaged position.

In a further aspect, the invention provides a device for a track- or rail-mounted closure drive assembly, the device including:

- a moveable trolley associated with a closure, the trolley configured for movement along the track or rail under drive by a drive component to move the closure between an open and a closed position;
- an engagement member arranged to provide selective engagement between the trolley and the drive component;
- a mechanism to move the engagement member between an engaged position and a disengaged position, the engaged position allowing motor drive of a closure by way of the drive component;
- the mechanism having a user actuation means for manipulation by a user;
- the device including a latch for latching the trolley to the track or rail when it is in a position associated with the closed position of the closure;
- the latch moveable between a latched and an unlatched position under operation of the mechanism that moves the engagement member, such that manipulation of the user actuation means to move the engagement member into its disengaged position also has the effect of moving the latch into its unlatched position.

The latch thus automatically moves into its unlatched position when the engagement member releases the engagement between the trolley and the drive component, to allow movement of the trolley along the rack or rail without operation of the drive component.

Preferably, said latch comprises a lever mounted for pivoting movement around a lever axis on said trolley, the lever axis preferably being substantially horizontal. Preferably, the lever includes a hook portion to engage, when the latch is in its latched position, with a latch stop on or mounted to the track or rail.

Preferably, the latch is biased into its latched state, e.g., by means of a spring, such as a torsion spring arranged around said pivot axis.

Preferably, said latch is arranged to automatically move into its unlatched position when the drive component is operated to move the trolley along the track or rail. To this end, the drive component (for example, comprising a belt joiner connecting the two ends of a drive belt to provide an endless loop) may include an element having a shaping which, when the drive component is operated, interacts with a part of the latch means to move it into its unlatched position, irrespective of the orientation of the rotating body.

In this way, the latch is arranged for automatic release when the trolley and drive component are mutually engaged and the trolley is driven by the drive component to drive the closure.

Preferably, the engagement between the engagement member and the drive component includes a lost motion arrangement, to allow limited movement of the drive component relative to the trolley, resulting in movement of the latch into its unlatched position, before further movement of the drive component causes movement of the trolley along the track or rail. This lost motion arrangement may be provided by the engagement member carried by the trolley engaging with an oversize recess (e.g., a long slot) in a part of the drive component.

In another aspect, the invention provides a closure drive assembly including a drive motor unit, a drive arrangement actuated by the motor unit, including said drive component; and a device as defined above with reference to any of the aforementioned aspects. The drive component may be for example a belt, chain or cable drive arrangement or any of the component parts and of such an arrangement.

In another aspect the invention provides a closure assembly, including a closure mounted to move between an open and a closed position and the above-defined closure drive assembly.

As will be understood from this specification, the invention provides a device for a closure drive assembly which addresses at least in part one or more of the disadvantages of the prior art, or at least provides a useful alternative.

Further aspects of the present invention and further embodiments of the aspects described in the preceding paragraphs will become apparent from the following description, given by way of example and with reference to the accompanying drawings.

BRIEF DESCRIPTION OF THE DRAWINGS

By way of example only, preferred embodiments of the invention will be described more fully with reference to the accompanying figures, wherein.

DETAILED DESCRIPTION OF THE DRAWINGS

Figure 1:
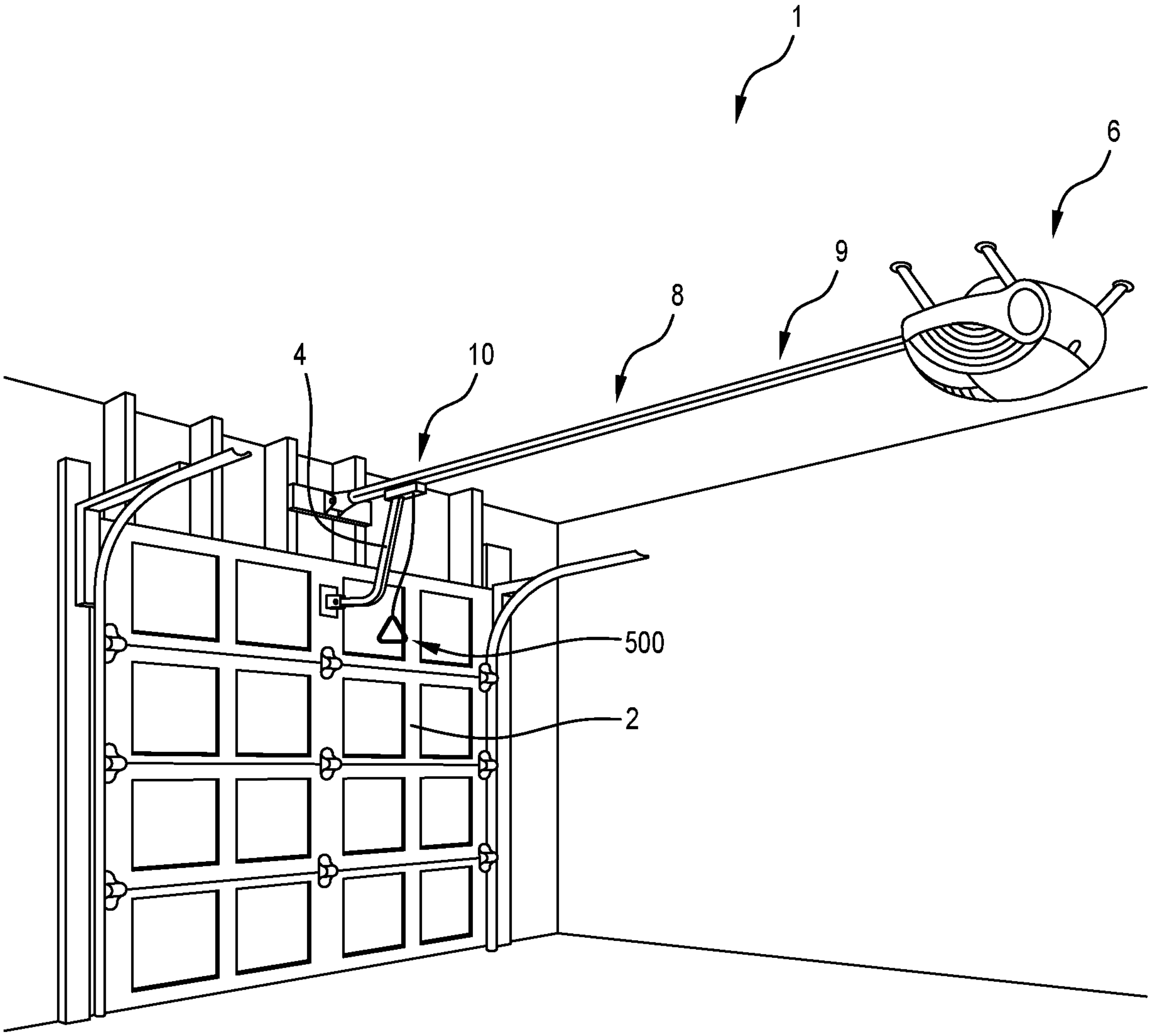
FIG. 1 illustrates a closure assembly according to the invention.

FIG. 1 shows closure assembly 1 installed in a garage to drive a door 2 between open and closed positions. A closure arm 4 connects door 2 to a closure drive assembly. The closure drive assembly includes a motor operator 6. The motor of operator 6 is arranged to drive a longitudinal drive member in the form of a drive belt 8, arranged in a closed loop arrangement within or around a track 9. A drive device for the closure drive assembly in the form of trolley 10 moves along the track 9 and is connected to the closure arm 4. As outlined further below, the trolley 10 is configured to selectively engage with a shuttle 600 (discussed further below) which connects the free ends of drive belt 8.

FIRST EMBODIMENT

Figure 2:
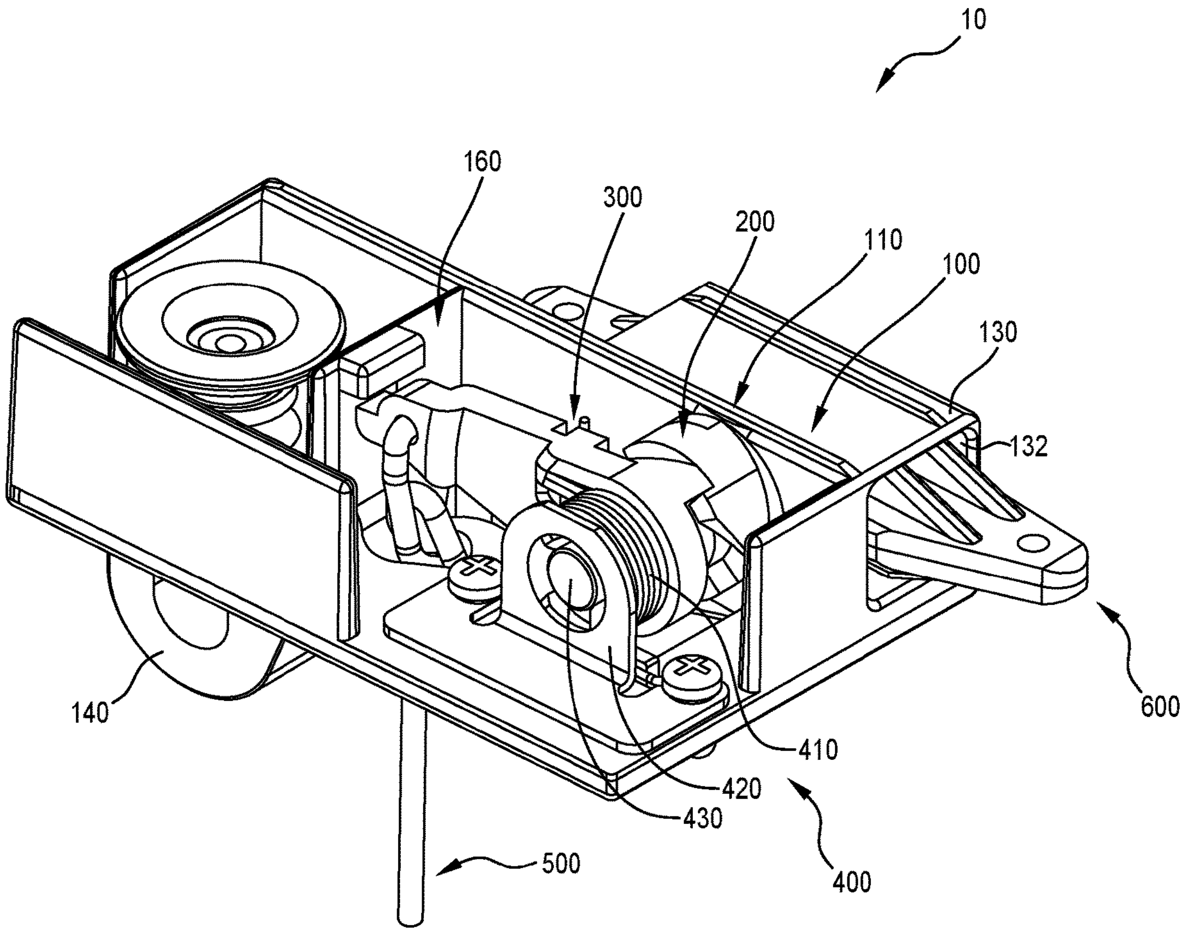
FIG. 2 is a perspective view of a device for the closure assembly of FIG. 1, according to a first embodiment of the invention.
Figure 18:
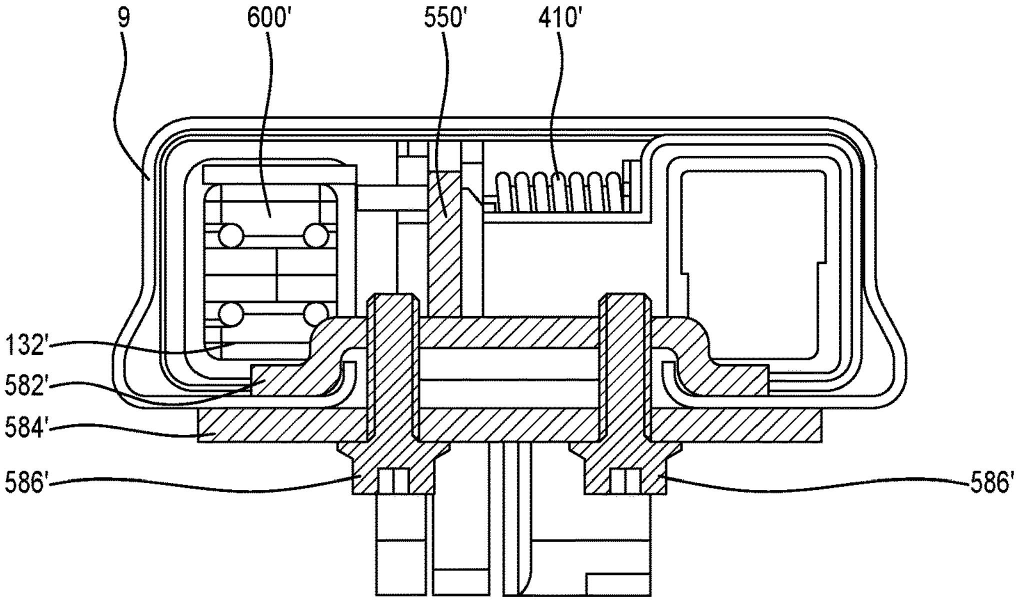
FIG. 18 a sectional view along plane CC of FIG. 16.

Trolley 10 is shown in FIG. 2, and includes a trolley body 100, a rotating body 200, a lever 300, an engagement assembly 400 and a release member 500. The trolley is configured to run along and within a downwardly open C-section track 9 (section visible in FIG. 18).

Figure 3:
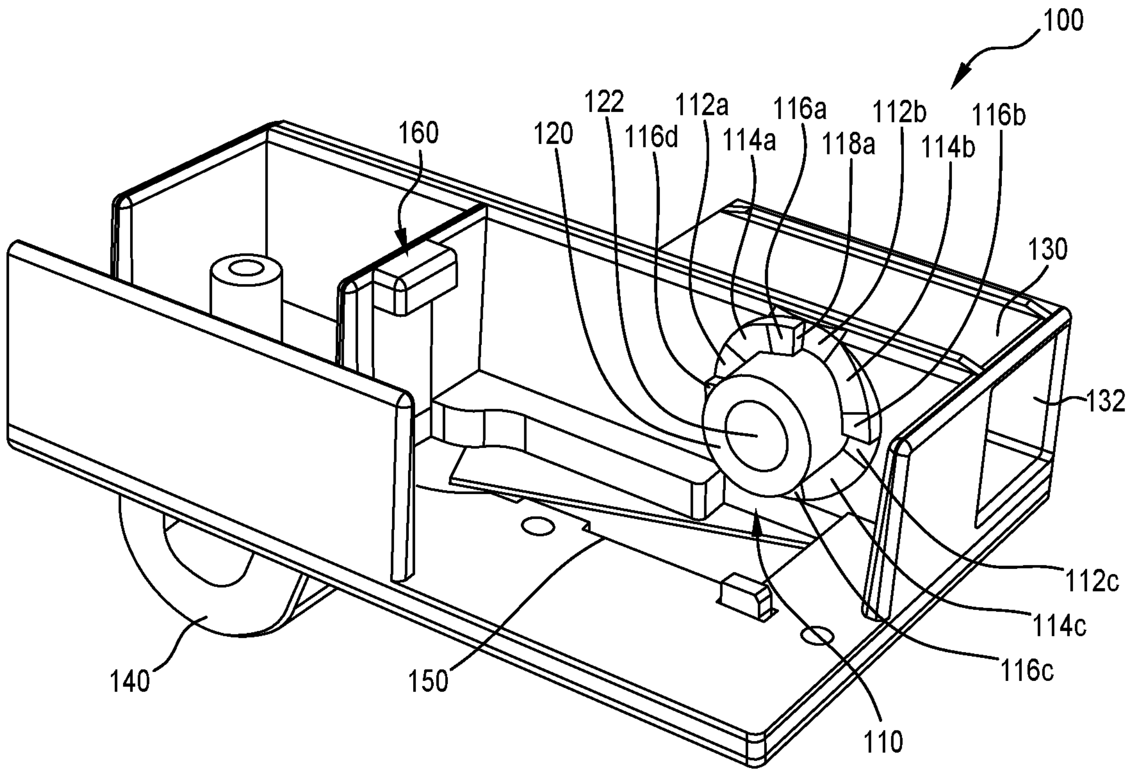
FIG. 3 illustrates in perspective view a trolley body shown in FIG. 2.

FIG. 3 shows trolley body 100 with the other trolley components removed, and includes a plurality of guiding surfaces 110 shaped and configured to guide the movement of the rotating body 200. The guiding surfaces 110 include lower guiding surfaces 112, inclined guiding surfaces 114, upper guiding surfaces 116 and transverse guiding surfaces 118. In this regard, it is noted that the use of a reference numeral followed by a lower-case letter in this specification typically indicates alternative instances of a general element identified by the reference numeral. Thus, for example, the lower guiding surface 112*a* is similar to but not necessarily identical to the lower guiding surface 112*b*. Further, references to an element identified only by the numeral refer to all instances of that element. Thus, for example, a reference to lower guiding surface 112 is intended to include the first lower guiding surface 112*a*, the second lower guiding surface 112*b*, the third lower guiding surface 112*c* and the fourth lower guiding surface (not visible in FIG. 3).

The inclined guiding surfaces 114 are angled relative to the lower guiding surfaces 112 and the upper guiding surfaces 116 and form a smooth transition therebetween. The transverse guiding surfaces 118 respectively extend, in a substantially perpendicular manner, between the upper guiding surfaces 116 and the adjacent lower guiding surfaces 112, and thus form an abrupt step therebetween. As evident in FIG. 3, each subset of guiding surfaces (e.g., surfaces 112*a*, 114*a*, 116*a*, 118*a*) extends for approximately 90° around a projecting annular support boss 120. Support boss 120 provides a bearing for rotation of rotating body 200 therearound, and the tubular bore 122 within support boss 120 provides a guidance throughway for an engagement member 430 extending therethrough, as explained further below.

Trolley body 100 further includes a lateral shuttle receiving portion 130 as shown, which includes a rectangular profile shuttle bore 132, sized and configured to receive drive belt 8 and a shuttle 600 therethrough. Trolley body 100 also includes a closure arm bracket 140 for attachment to closure arm 4, allowing movement of trolley 10 to be transferred to door 2. In addition, trolley body 100 includes an elongated lever aperture 150 to allow movement of lever 300 therethrough. A stop 160 provided on trolley body 100 is positioned above a part of the lever 300 to provide a resting position for lever 300 and to prevent its over-rotation.

Figure 4:
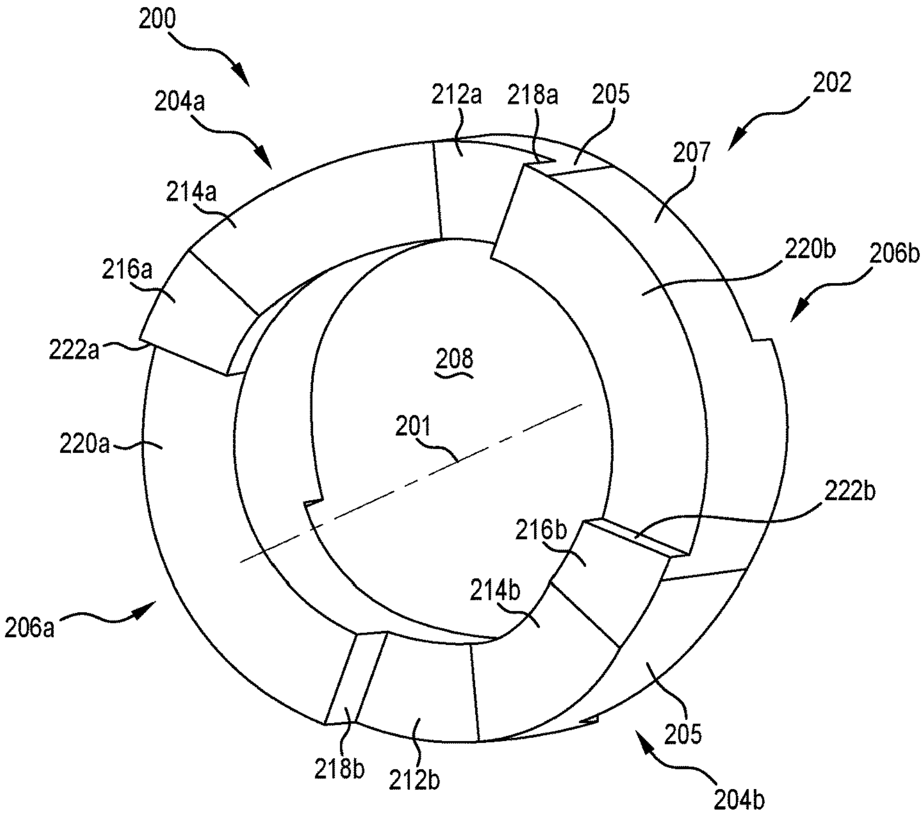
FIG. 4 illustrates in front perspective view a rotating body shown in FIG. 2.
Figure 5:
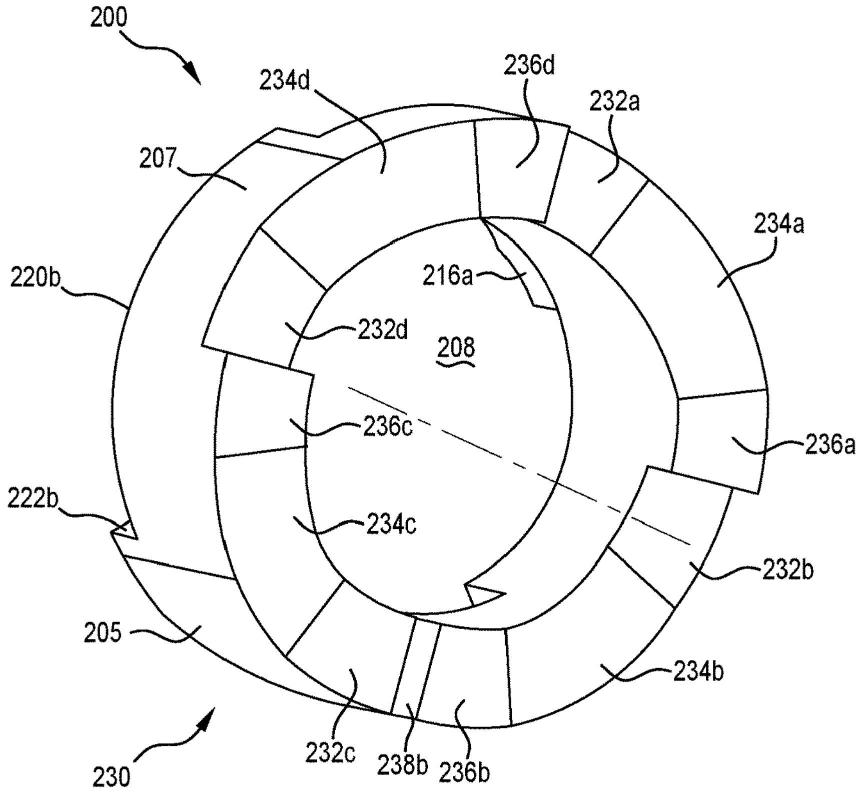
FIG. 5 illustrates in rear perspective view the rotating body of FIG. 4.

Rotating body 200 is further shown in FIGS. 4 and 5. Rotating body 200 is of substantially annular form with a circular throughbore 208 around a rotational central axis 201. The bore 208 has a diameter to seat for rotation around the annular support boss 120 of trolley body 100.

A front face of rotating body 200 (FIG. 4) extends substantially transversely to axis 201 and includes camming surfaces 202. Rotating body 200 further includes position indicating surfaces 204*a*, 204*b* and 206*a*, 206*b*, arranged on its circumferential external surface. Position indicating surfaces 204*a*, 204*b* include a green indicia 205, while disengagement setting surfaces 206*a*, 206*b* include a red indicia 207, as discussed further below. Each surface 204*a*, 206*a*, 204*b*, 206*b* covers of the circumferential outer surface of body 200.

Camming surfaces 202 include various arcuately extending parts, with radial transitions therebetween, comprising lower surfaces 212*a*, 212*b* and upper surfaces 216*a*, 216*b*, with inclined ramp surfaces 214*a*, 214*b* providing a smooth transition therebetween. Upper surfaces 216*a*, 216*b* terminate in first transverse surfaces 222*a*, 222*b* (orientated parallel to central axis 201), which provide a step down to intermediate lower surfaces 220*a*, 220*b* which act as offset setting surfaces (as described below), which in turn step down to lower surfaces 212*a*, 212*b* by way of second transverse surfaces 218*a*, 218*b*. It will be appreciated that surfaces 212*a*, 214*a*, 216*a*, 220*a* and 222*a* are respectively positioned on diametrically opposite sides of rotating body 200 to surfaces 212*b*, 214*b*, 216*b*, 220*b* and 222*b*. The lower, upper and intermediate lower surfaces 212, 216 and 220 are all planar surfaces extending perpendicularly to central axis 201.

The intermediate lower surfaces 220*a*, 220*b* provide offset setting surfaces. As described in further detail below, these surfaces 220 assist in disengaging an engagement member 430 by providing an offset position therefor.

A rear face of rotating body 200 (FIG. 5) extends substantially transversely to axis 201, and includes body camming surfaces 230, configured to engage and interact with the guiding surfaces 110 of trolley body 100. Body camming surfaces 230 include lower body surfaces 232 and upper body surfaces 236, with inclined ramp body surfaces 234 providing smooth transitions therebetween as shown. The other end of each upper body surface 236 features a step 238 (orientated parallel to central axis 201) providing an abrupt transition to the next lower body surface 232.

Each subset of body camming surfaces (e.g., surfaces 232*a*, 234*a*, 236*a*, 238*a*) extends through a quarter of the full arcuate range. As will be understood from the description below, the movement of the body camming surfaces 230 against the guiding surfaces 110 provides indexing of the rotational movement of rotating body 200 around annular support boss 120.

Figure 6:
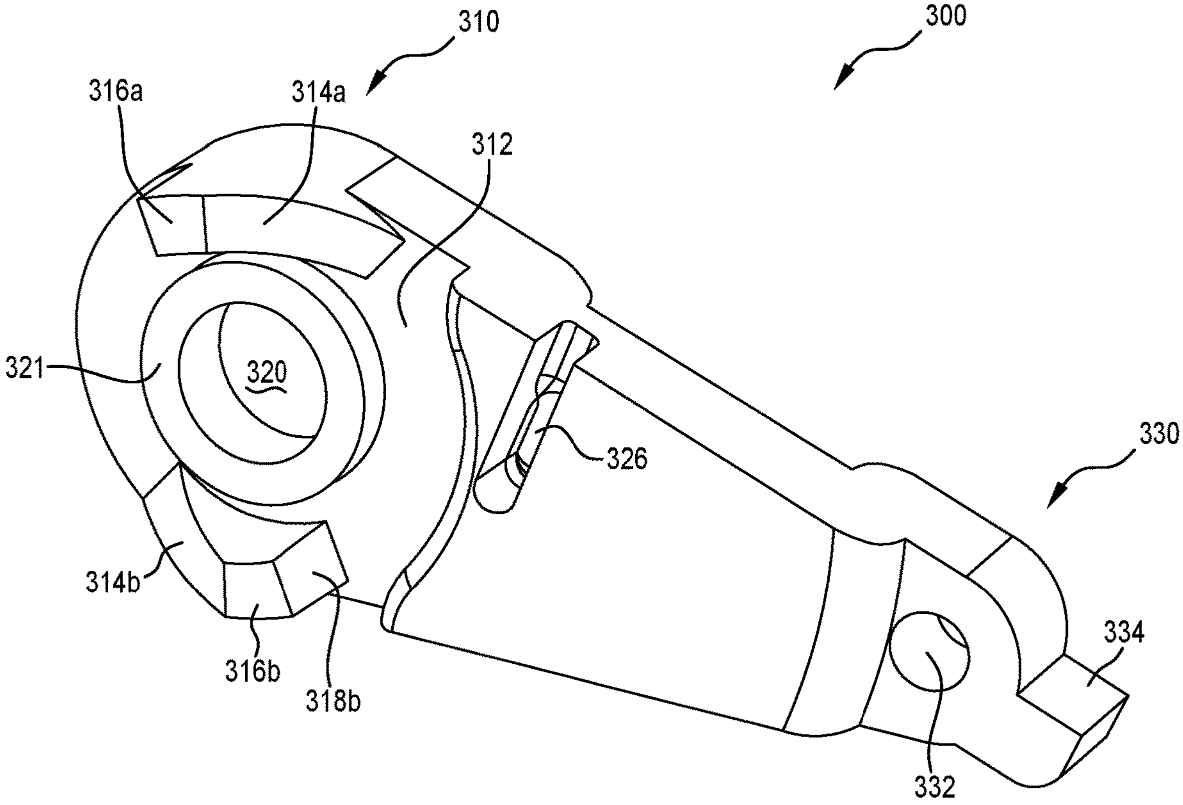
FIG. 6 illustrates in perspective view a lever shown in FIG. 2.

Lever 300 is illustrated in FIG. 6 and has a general lever arm form as shown. Lever 300 includes arcuate lever camming surfaces 310 arranged around a lever bore 320, surfaces 310 configured to engage with the camming surfaces 202 of rotating body 200 so to drive rotation thereof. Lever bore 320 has a diameter to seat for rotation around engagement member 430, around the same rotational central axis 201. Associated with lever bore 320 is an annular projection 321 arranged to bear against the end of the annular support boss 120 of trolley body 100.

Lever camming surfaces 310 comprise inclined lever surfaces 314*a*, 314*b* which meet upper lever surfaces 316*a*, 316*b*. Upper lever surfaces 316*a*, 316*b* terminate in transverse lever surfaces 318*a*, 318*b* (orientated parallel to central axis 201), which provide a step transition down to a lower lever surface 312. Lower lever surface 312 and upper lever surfaces 316*a* and 316*b* are planar surfaces extending perpendicularly to central axis 201. As FIG. 6 shows, surfaces 314*a*, 316*a*, 318*a* are respectively diametrically opposed to surfaces 314*b*, 316*b* and 318*b*.

On the arm of lever 300, near the lever camming surfaces, is a notch 326 shaped to receive the end of spring 410, as discussed below.

At the other end of the lever arm of lever 300 a lever end portion 330 is provided, having a release member attachment 332, to be connected to the release member 500 (e.g., a cord) to afford actuation of lever 300. It will be appreciated that lever 300 and release member 500 may be integrated or alternatively made from separate parts. In addition, lever 300 includes an end stop portion 334 configured to engage with stop 160 of trolley body 100.

As discussed further below, engagement member 430 is a cylindrical pin arranged to be driven in the axial direction by movement in that direction by the lever 300, against the force of a coil spring 410, by virtue of retaining clip 440 carried in a circumferential groove in member 430. When engagement assembly 400 is assembled, spring 410 is positioned in a compressed state between lever 300 (with a suitably shaped end of the spring locating in notch 326) and an end plate 420, which acts to bias lever 300 towards its resting position. Spring 410 serves to bias engagement member 430 into the shuttle bore 132 to engage with shuttle 600 by way of a groove or suitable recess in the outer wall thereof. As will be understood, when member 430 is engaged with shuttle 600, movement of drive belt 8 results in trolley travelling along track 9.

In the resting position, end stop portion 334 of lever 300 engages with stop 160. The ends of spring 410 are engaged with end plate 420 and lever 300, so to bias lever 300 towards this resting position. Spring 410 thus acts both as a compression spring and as a torsion spring.

As FIG. 2 shows, end plate 420 has a circular aperture (to allow axial movement of engagement member 430) and is formed as part of a bracket rigidly mounted to the base of trolley body 100 by way of two bolts or screws, thus providing a fixing position for the end of spring 410.

Figure 7:
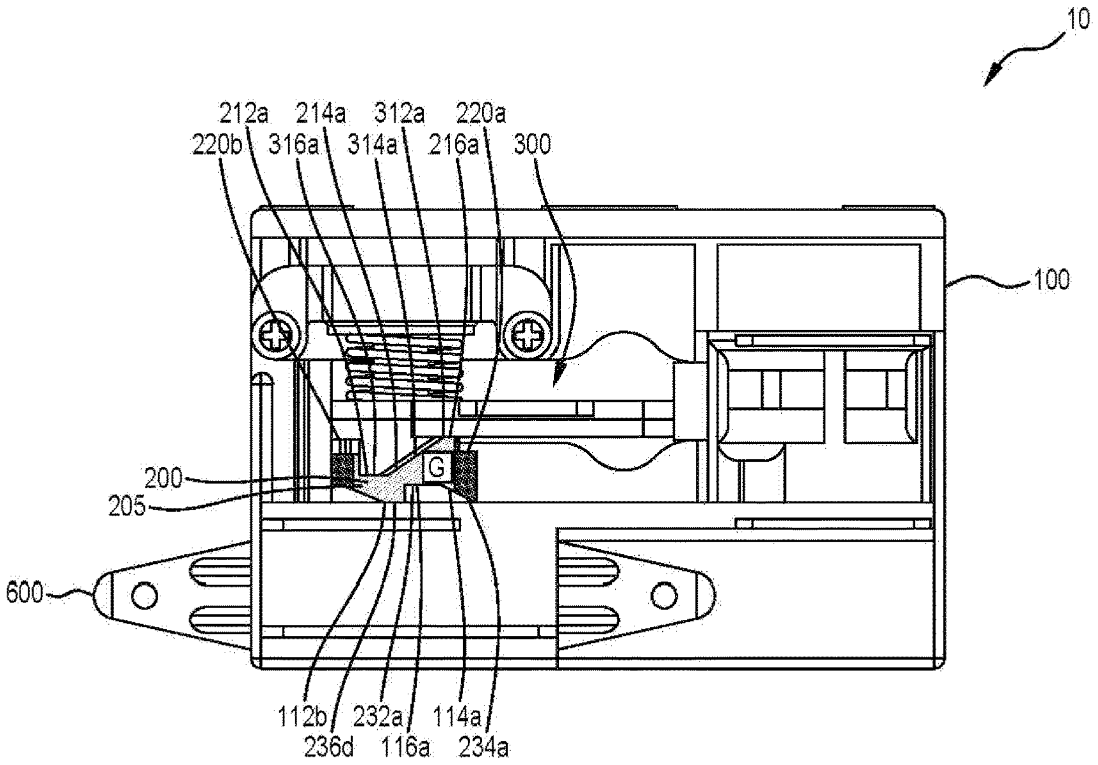
FIGS. 7, 9 and 11 illustrate in plan view the device of FIG. 2 in respectively three different operational configurations.

FIG. 7 illustrates the drive device in a first configuration, with lever 300 is in its resting position. In this configuration, camming surfaces 310 engage with corresponding camming surfaces 202 of rotating body 200. In particular, lower surface 212*a* is engaged with upper lever surface 316*a*, inclined surface 214*a* is engaged with inclined lever surface 314*a*, upper surface 216*a* is engaged with lower lever surface 312, and transverse lever surface 318*a* is engaged with transverse surface 218*a*. There is similar engagement between the other respective elements of these camming surfaces.

Further, in this configuration, guiding surfaces 110 are engaged with corresponding body camming surfaces 230. Lower guiding surface 112*b* is engaged with upper body surface 236*d*, upper guiding surface 116*a* is engaged with lower body surface 232*a*, and inclined guiding surface 114*a* is engaged with the inclined body surface 234*a*. There is similar engagement between the other respective elements of these camming surfaces.

Figure 8:
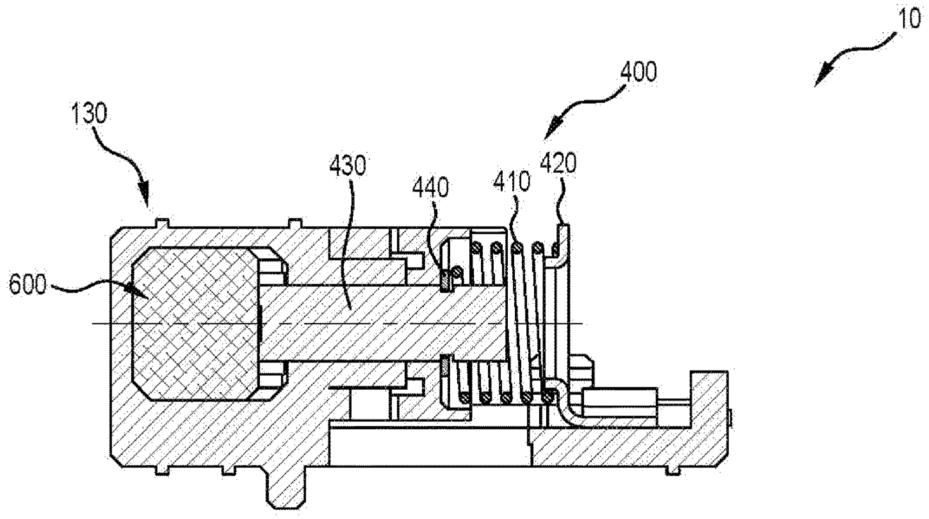
FIGS. 8, 10 and 12 illustrate in cross sectional view the device of FIG. 2 in, respectively, the three different operational configurations.

In this configuration, and as can be seen in FIG. 8, engagement member 430 extends into shuttle bore 132 to engage with shuttle 600. Viewed from below, green indicia (G) 205 is visible to a user or operator, who can thus readily see that the trolley assembly is in the engaged state, in which movement of drive belt 8 is transferred to trolley 10, so to drive door 2.

Figure 9:
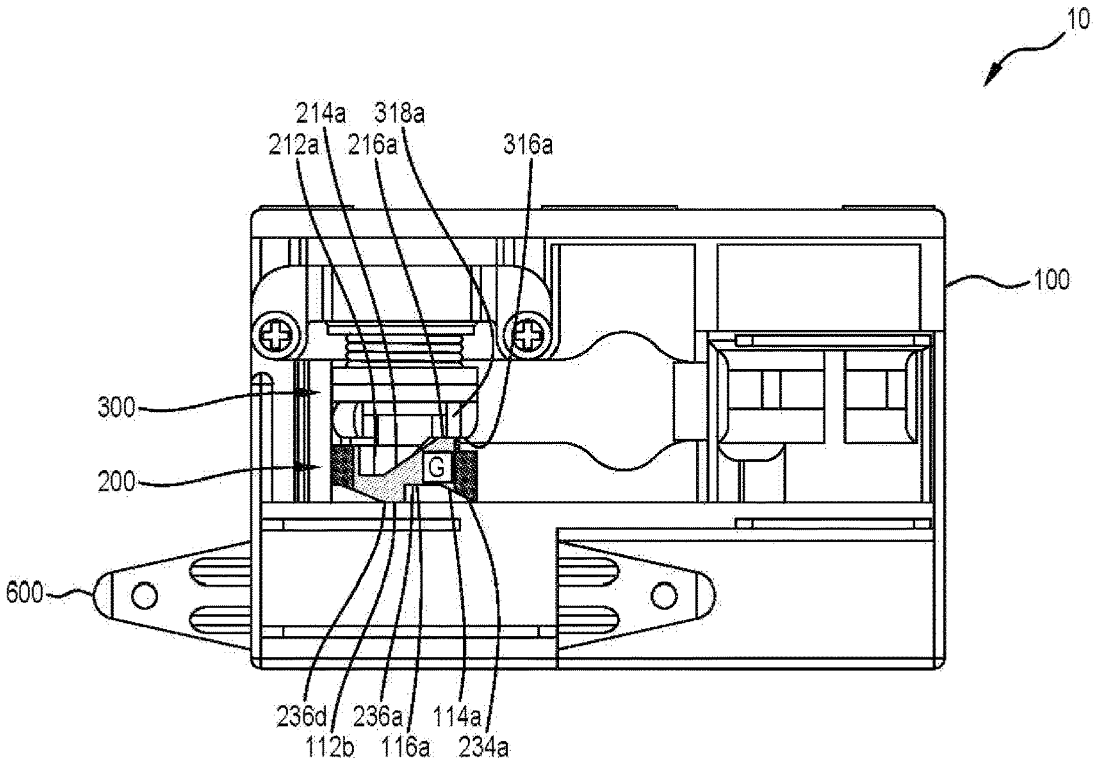
Figure 10:
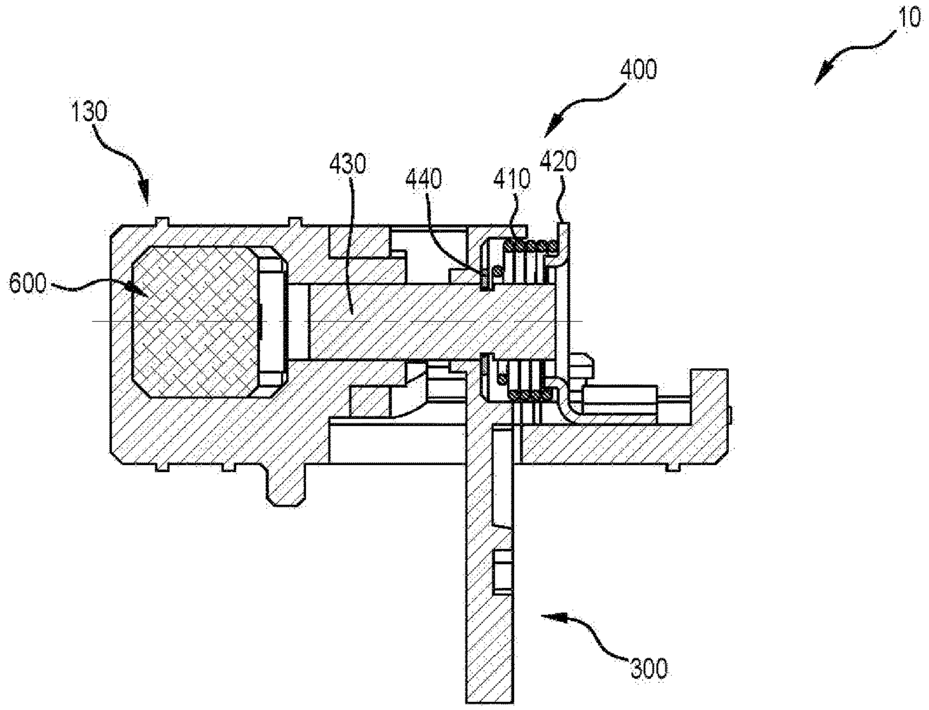

If the user wishes to disengage the trolley from the drive, e.g., to manually operate door 2, engagement member 430 needs to be withdrawn from engagement with shuttle 600. To this end, the user pulls down on release member 500, which rotates lever 300 to the position illustrated in FIGS. 9 and 10. In this movement, lever camming surfaces 310 interact with the complementary camming surfaces of rotating body 200. In particular, inclined lever surfaces 314 slide along inclined ramp camming surfaces 214 until upper lever surfaces 316 meet and slide along upper surfaces 216. This camming movement moves lever 300 in an axial direction relative to rotating body 200, compressing spring 410 and accordingly, moving engagement member 430 in the same direction, so to disengage it from shuttle 600, as shown in FIG. 10.

Further, as lever 300 is rotated in this way, the torque on spring 410 increases.

At a certain point of rotation of lever 300, upper lever surfaces 316 move beyond the end of upper surfaces 216 and under force of spring 410 move relative to rotating body 200 to abut offset setting surfaces 220, accompanied by a click audible to the user. The configuration of the mechanism is such that this point can only be reached by operating release member 500 with a substantial component of movement in a direction away from door 2. This substantial component may be, for example, 10° away from vertical in a direction away from the door.

At this point, release of member 500 by the user allows lever 300 to rotate back under spring force to its resting position, at which stop portion 334 engages once again with stop 160. During this rotation, transverse lever surfaces 318 engage first transverse lever surfaces 222, so to rotate rotating body 200 through 90°. Further, during this rotation, body camming surfaces 230 are rotated relative to guiding surfaces 110. In particular, each set of body camming surfaces (e.g., 232*a*, 234*a*, 236*a*) is shifted to an adjacent set of guiding surfaces 110 on trolley body 100, the mutual engagement being realised by the moving into mutual abutment of transverse body surfaces 238 against transverse guiding surfaces 118 with an axial movement of body 200, accompanied by a further audible click.

Figure 11:
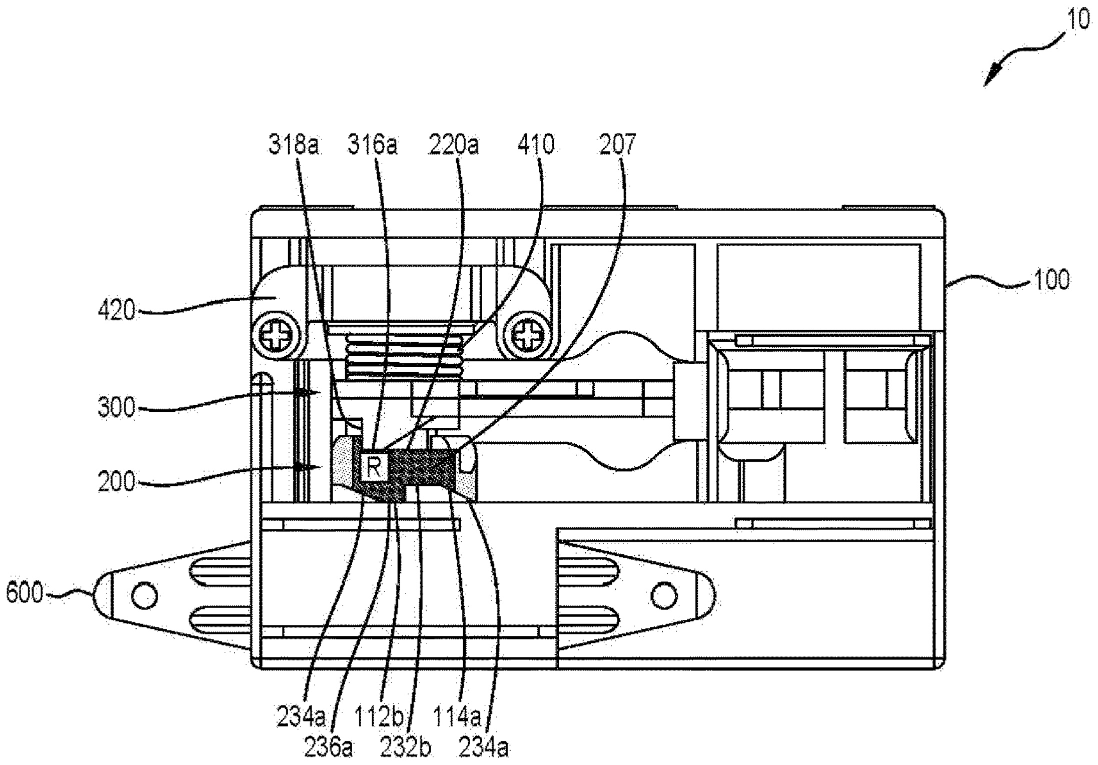
Figure 12:
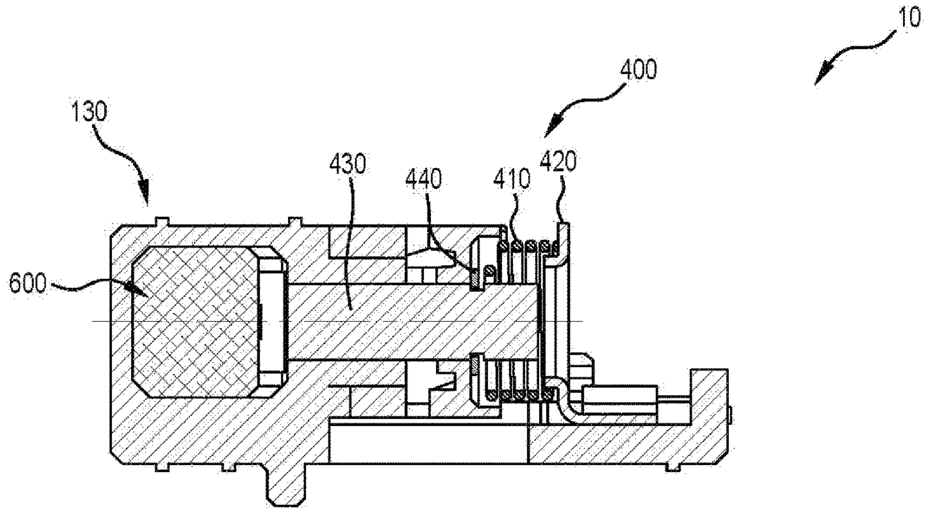
Figure 13:
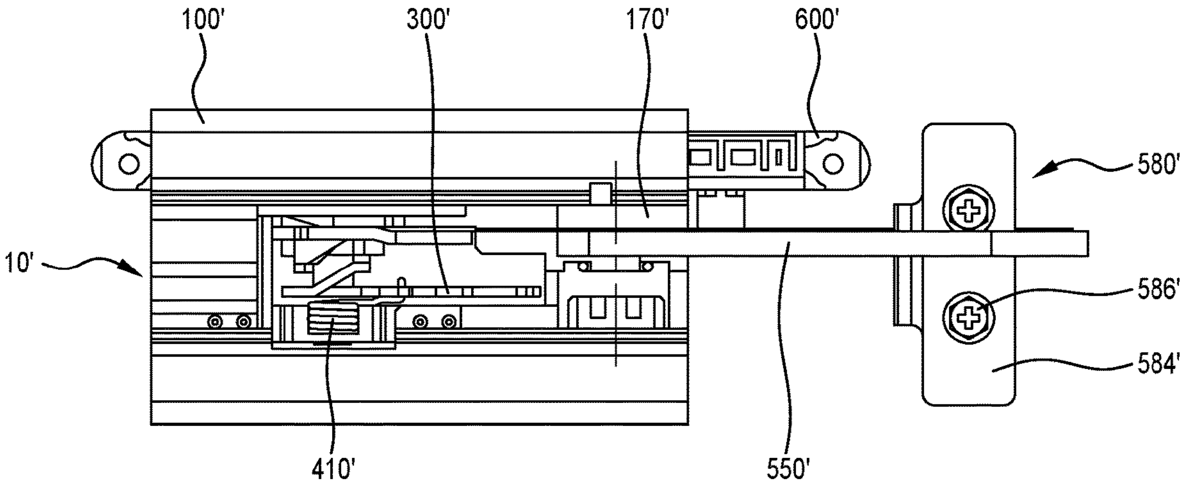
FIG. 13 is a top plan view of a device for the closure assembly of FIG. 1, according to a second embodiment of the invention.

In this configuration, illustrated in FIGS. 11 and 12, with upper lever surfaces 316 engaged with the offset setting surfaces 220 of rotating body 200, lever 300 rests in an offset axial position, maintaining engagement member 430 in an axial position disengaged from shuttle 600. Viewed from below, red indicia (R) 207 is visible to a user, who can thus readily see that the trolley assembly is in the disengaged state, in which door 2 can be manually moved, with trolley 10 freely moving relative to shuttle 600 along track 9.

As will be understood, in order to move engagement member 430 back into a position where it can re-engages with shuttle 600, the release member 500 is again operated in the same manner, which moves upper lever surfaces 318 along intermediate lower surfaces 220 to a point at which where upper lever surfaces 318 engage once again with the lower surfaces 212 under the spring force (with an audible click). Following this, as member 500 is released, lever 300 rotates back to its resting position under force of spring 410, and transverse lever surfaces 318 act to drive second transverse surfaces 218 and thus to rotate rotating body 200 by a further 90°. At the same time, during this movement, each set of body camming surfaces (e.g., 232*a*, 234*a*, 236*a*) is shifted to the next adjacent set of guiding surfaces 110 on trolley body 100, the mutual engagement being realised by the moving into mutual abutment of transverse body surfaces 238 against transverse guiding surfaces 118 with an axial movement of body 200, again accompanied by a further audible click.

This therefore results in a return to the configuration of FIG. 7 although, as will be appreciated, opposite faces of rotating body 200 are engaged (e.g., upper lever surface 316*a* is engaged lower surface 212*b*). Again, green indicia (G) 205 is visible, to provide to a user clear confirmation that the engagement member is in a position to re-engage with shuttle 600. As will be understood, the engagement of rotating body 200 restricts its rotation to one direction (clockwise, as seen in FIG. 2), each full pull and release of release member 500 resulting in a 90° rotation of body 200 in that direction.

As will be understood, the engagement between rotating body 200 and body camming surfaces 230 provides a one way ratchet with a 90° indexing, while the engagement between lever camming surfaces 310 and the rotating body afford successive rotations of the rotating body by 90°, each successive rotation resulting in an alternation between the two different axial positions of lever 300, due to the different axial offsets provided by the lower 212 and lower intermediate 220 surfaces of the rotating member (which control the position of engagement member 430), as well as an alternation between visible green and red indicia. As will be clear, this provides for engagement and disengagement to be achieved by the same user action, which avoids the need for users to apply different (possibly less intuitive) actions to achieve the desired setting.

Importantly, by requiring that a release must be made with a substantial component of movement in a direction away from door 2, the security of the closure assembly 1 is greatly enhanced, as a purely downward pull on release member 500 or downward pull with a component towards door 2 (such as would result in accessing and pulling it from outside the door) will not result in disengagement of the trolley from the shuttle. It is thus extremely difficult for an unauthorised person who manages to reach and manoeuvre release member 500 from outside the door (e.g., with a shaped wire tool introduced between door and frame) to successfully effect disengagement of the door from the drive.

Further, the green and red indicia 205, 206 and the positive engagement into each position (with audible feedback) assist users to determine the state of the engagement member 430, which further assists with regard to ease of use, reliability and security.

SECOND EMBODIMENT

An alternative embodiment of the present invention is illustrated in FIGS. 13-18. In these figures, the corresponding components to those described above are denoted with the same reference numerals with the addition of an apostrophe. Hence reference 100' refers to the trolley body of the second embodiment, etc.

The mechanism to engage and disengage drive between trolley 100' and shuttle 600' functions in the same manner as that illustrated and described above with reference to the first embodiment, and will not therefore be described again in detail, other than with reference to differences in particular features and interengagement with additional components specific to this embodiment.

Figure 16:
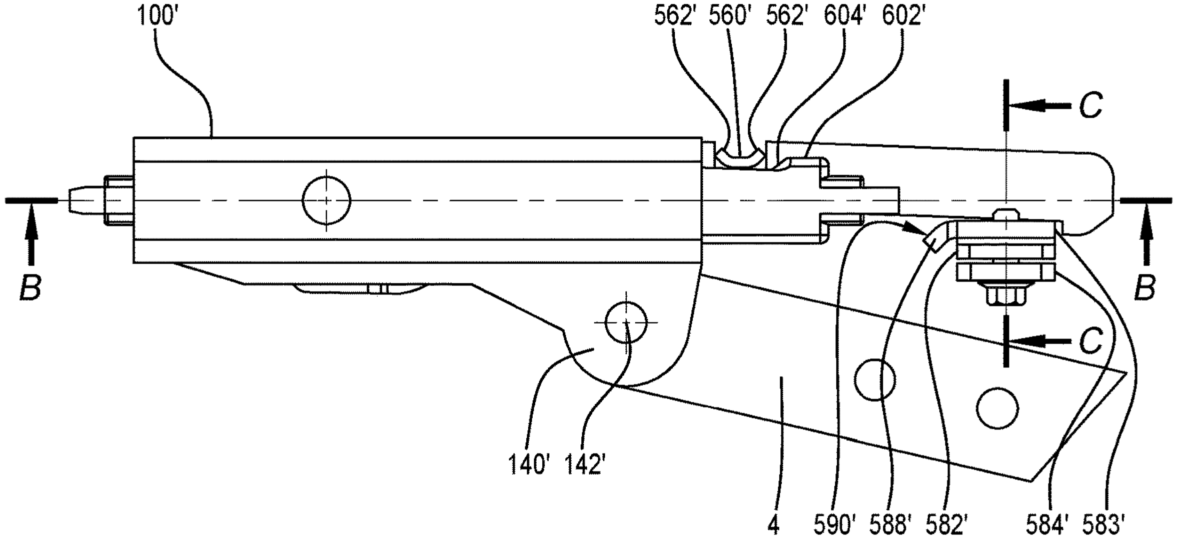
FIG. 16 is a side view of the device shown in FIG. 13.

The drawings of the second embodiment show closure arm 4 connected to closure arm bracket 140' by way of pivoting connection 142'. Further, the second embodiment employs a different form of belt-joiner shuttle 600'. In particular, as can be seen in FIG. 16, shuttle 600 includes a relatively raised portion 602' adjacent one end (the end closest to door 2), with a smooth transition provided from the adjoining upper surface closer to the centre of shuttle 600' by way of ramp 604'.

In addition, FIGS. 13-18 illustrate a track latching lever 550' configured to automatically lock trolley 10' to a track latch means 580' when the trolley is in the door closed position, and arranged to automatically release by virtue of shuttle ramp 604' when trolley 10' is driven by shuttle 600'.

Figure 14:
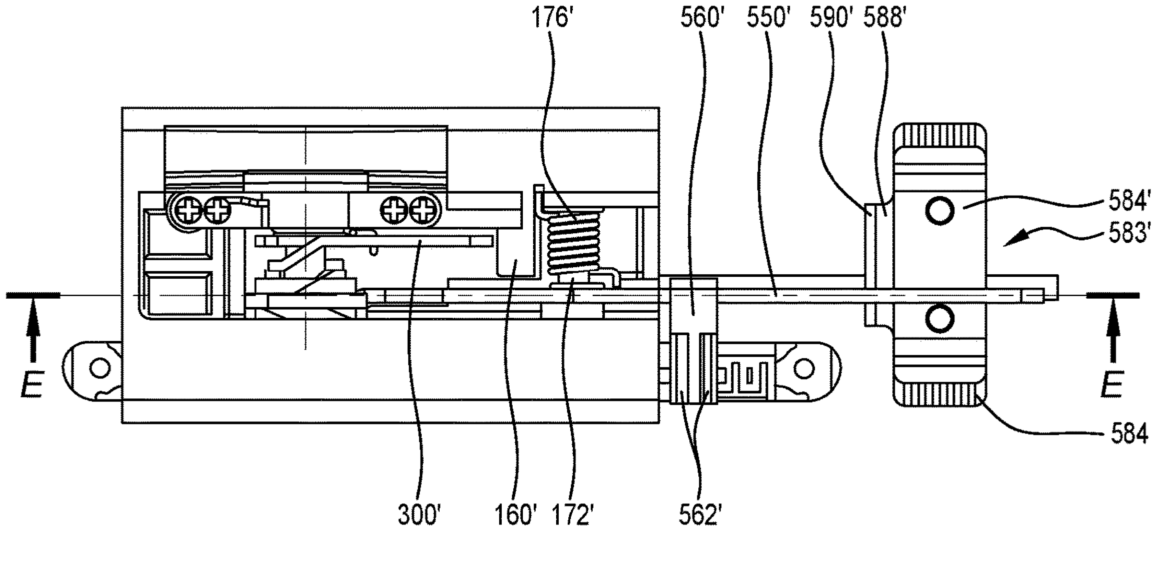
FIG. 14 is a bottom plan view of the device shown in FIG. 13.
Figure 15:
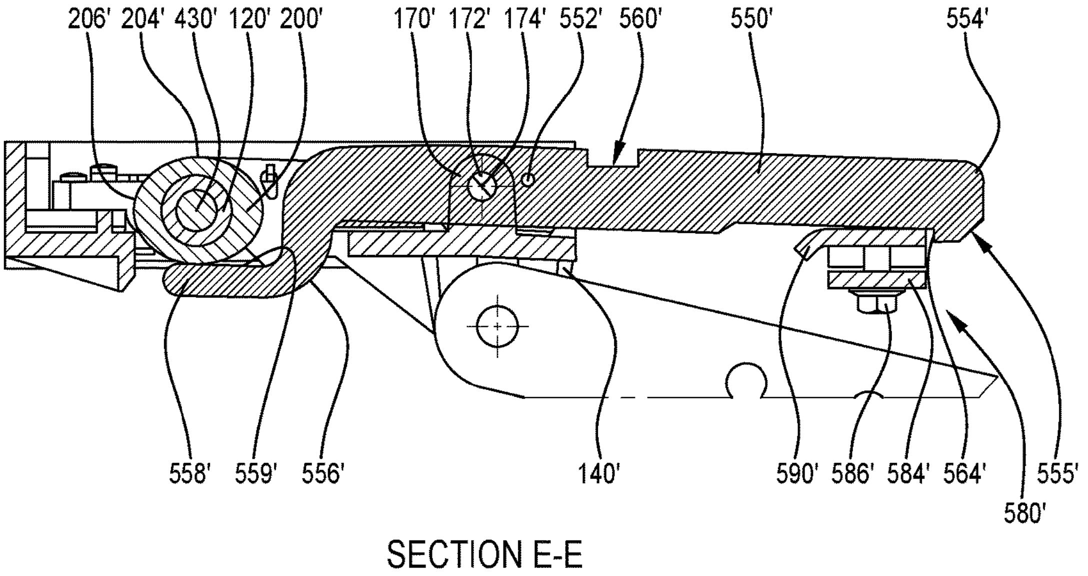
FIG. 15 is a sectional view along plane EE of FIG. 14.
Figure 17:
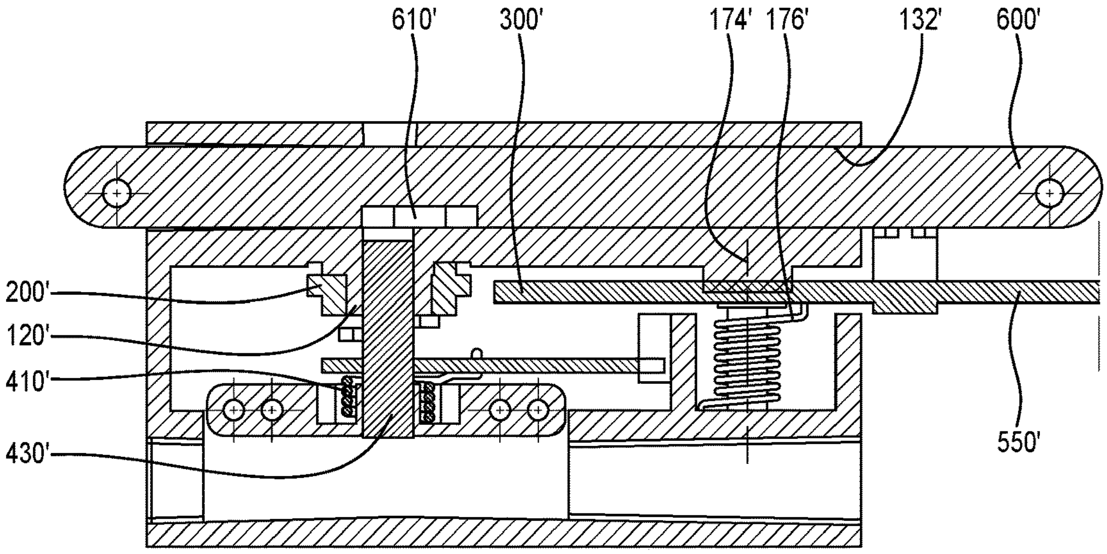
FIG. 17 a sectional view along plane BB of FIG. 16.

As most clearly seen in FIG. 15, track latching lever 550' is mounted to trolley body 100' by way of a pivoting connection with suitably shaped boss formation 170' integrally formed with and projecting upwardly from the base of trolley body 100'. A cylindrical pin 172' passing through suitably sized and positioned circular bores in boss formation 170' and lever 550' provides an articulation axis 174' for lever 550. As shown in FIGS. 14 and 17, a torsion spring 176' mounted around pin 172', with an end locating in a small blind hole 552' in the side of lever 550', biases the outboard end 554' downwardly (i.e., biased in the clockwise direction relative to trolley body 100' as seen in FIG. 15), as discussed further below.

As shown in the drawings, track latching lever 550' has a generally planar elongate form, with its pivot position approximately midway along its length. For most of its length it is straight, with a significant portion projecting out of trolley body 100' in a direction towards garage door 2, terminating in outboard end 554'. Towards the other end, located largely within trolley body 110, it features a downward dog-leg portion 556' terminating in a generally horizontal inboard end 558'.

Near the upper edge of lever 550' in the portion projecting out of, but still close to, trolley body 100', is formed a lateral tab 560' which projects in a transverse direction relative to lever 550' (shown most clearly in FIG. 14). The lateral-most part of this tab is shaped with upwardly inclined wing portions 562' whose lower faces thus provide ramp surfaces in both the forward and backward direction relative to longitudinal movement of the shuttle 600'. At the lower edge of outboard end 554', lever 550' has a hook form, with a lower, outer leading edge 555' of ramped form and a hook 564'. Ramp edge 555' and hook 564' provide means of engagement with a latch stop means 580', as described in further detail below.

The means for engagement and disengagement of trolley 10' from shuttle 600' are in most respects as described above with reference to the first embodiment. In particular, trolley body 110' features a suitably shaped and positioned annular support boss 120' providing ramp camming guide surfaces against which rotating body 200' is mounted and urged by spring 410' (which also serves to return lever 300' to its rest position once it has been pulled and released). Rotating body 200' and lever 300' are provided with suitable ramp camming surfaces to effect the same mechanism, whereby a first full pull on lever 300' in a direction with a substantial component of movement away from door 2, and subsequent release, serves to rotate body 200' by 90°, the engagement with support boss 120' resulting in axial movement of lever 300' against the force of spring 410', so moving engagement member 430' out of engagement with shuttle 600'. A further full pull on lever 300' in the same direction, with subsequent release, rotates body 200' by a further 90°, allowing it (by virtue of its engagement with the surfaces of support boss 120') to return to its original axial position, such that engagement member 430' projects within shuttle bore 132' to afford engagement with shuttle 600'.

In this embodiment, as shown most clearly in FIG. 15, rotating body 200' has an eccentric sectional form, with circumferentially opposing lobes providing surfaces 206' separated by 90° to surfaces 204'. As the figure shows, surfaces 206' define a maximum outer surface radius (from the centre of rotation of body 200'), while surfaces **204*a*' define a minimum outer surface radius. This form of the outer surface of body 200'** provides an eccentric cam function, as described below.

The upper face 559' of lever inboard end 558' of track latching lever 550' bears against the outer surface of rotating body 200', to act as a cam follower. When a cam surface 204' engages follower face 559' (i.e., the state shown in FIG. 15), spring 176' provides that lever 550' is in a latched state to engage hook 564' over the edge of the stop plate in latch stop means 580'. When rotating body 200' rotates such that a cam surface 206' engages follower face 559', lever 550 is rotated about pivot axis 174' into an unlatched state, to disengage hook 564' from latch stop means 580'. Hence, for each 90° rotation of body 200', lever 550' alternates between its latched and unlatched state. As will be appreciated, these two states correspond, respectively, with the downward orientation (and hence visibility) of green and red indicia 205' and 207'.

Another distinction of this second embodiment of the invention is that engagement member 430' is received in a blind long slot 610' (see FIG. 17) in the side of shuttle 600', providing a prescribed degree of play in the cooperation between the two.

As shown in FIGS. 13 to 16, latch stop means 580' comprises a top latch plate 582' and a bottom clamping plate 584', fastened together by two laterally spaced bolts 586'. Latch plate 582' is of curved form when seen in cross section (see FIG. 18), shaped and sized such that latch stop means 580' can be clamped at a selected longitudinal position on track 9 by tightening bolts 586'. Latch plate 582' includes a front lip 588' bent downwardly to provide an upper leading latch ramp 590', and an abrupt rear edge 583' against which hook 564' is retained when lever 550 is in its latched position.

This mechanism, interacting with the other parts of trolley 10' and shuttle 600', provides an automatic latching means for trolley body 110' when in its normal 'door closed' position, as shown most clearly in FIGS. 15 and 16. In this state, trolley 10' and shuttle 600 are engaged, green indicia 205' is visible to a user, and the engagement of lever 550' with latch stop means 580' firmly restrains trolley 10' against forced movement along track 9.

When electric motor operator 6 is employed to drive belt 8 to open door 2, belt connector shuttle 600' moves in a direction towards the drive pinion. The play provided by long slot 610', within which the end of engagement member 430 is located, allows around 10 mm of movement before shuttle 600' begins to move trolley body 110. Within this movement, shuttle ramp 604' engages with the ramp surface of the leading inclined wing portion 562' of lateral tab 560', so lifting tab 560' up on to raised end portion 602'. This has the effect of raising the projecting end of lever 550', thus disengaging latch hook 564' from the restraining edge 583' of latch stop means 580'. This lost motion arrangement means that by the time trolley 10' begins its movement, driven by its engagement with shuttle 600, latch lever 580' is in its unlatched position, and follower face 559' of lever inboard end 558' is no longer seated on cam surface 204'. Of course, green indicia 205' remains visible to the user, as body 200' has not been rotated.

Full or partial opening of door 2 can then follow. When the door is closed again, shuttle 600' returns trolley 10' toward its rest position (door closed position), the movement of shuttle 600' in this direction relative to trolley body 110' resulting in tab 560' travelling back down ramp 604', allowing latching lever 550 (by virtue of ramp edge 555' and hook 564') to latch again with latch stop means 580' once the door is closed.

Selective disengagement of the trolley from the drive for manual operation of door 2 results (as in the first embodiment) in withdrawal of engagement means 430' and rotation of rotating body 200' by 90°. This exposes red indicia 207' to a user, and at the same time the cam action between lobe surface 206' and follower surface 559' results in unlatching lever 550' from latch stop means 580' (by way of anticlockwise rotation of lever 550', when viewed as shown in FIG. 15). With the trolley unlatched and the engagement between trolley and shuttle released, door 2 can be manually opened, trolley 10' running freely along track 9 while the belt drive means 8 (and belt connector shuttle 600') remain stationary. Manual closure of the door will return trolley 10' to its 'door closed' position, from where it can be selectively re-engaged with shuttle 600' (through a further pull-operation of release member 500), which will result in automatic re-latching of lever 550' (as rotating member 200' has now moved through a further 90° rotation).

Alternatively, if release member 500 is actuated when the door is still in an open position, and electric motor operator 6 is actuated, belt drive means 8 will be driven until shuttle 600' is received by shuttle bore 132'. The rounded end of shuttle 600' (see FIG. 17) results in engagement means 430' being automatically depressed against spring 410', to then re-engage with long slot 610'. Because the trolley engage/disengage mechanism is in its engaged position, latching lever 550' is in its latched orientation and, when door 2 is then driven to its closed position, ramped lower leading edge 555' of lever outboard end 554' rides up over ramp 590' of lip 588' of latch plate 582', to allow hook 564' to engage over edge 583 of plate 582'. This once more latches lever 550' to latch stop means 580', so latching trolley to track 9.

The components of the devices of the two embodiments described and illustrated herein are manufactured from suitable plastics and metal materials. The plastics components may be plastic formed using typical injection moulding processes known in the art, the plastic material selected for suitability for the present purposes. Metal parts may be mild steel or die-cast from a suitable allow such as an aluminium alloy.

In particular, certain parts such as the trolley body and the shuttle may be manufactured from a suitable engineering polymer, such as Dupont's Delrin®, an acetal homopolymer self-lubricating resin material, which is lightweight but durable and has suitable low wear and low friction properties. The rotating body is preferably made from an aluminium alloy, while the latch lever and latch stop components are made from mild steel. The springs are fabricated from music wire steel, all circlips from a suitable spring steel.

In this specification, adjectives such as left and right, top and bottom, upper and lower, first and second, and the like may be used to distinguish one element or action from another element or action without necessarily requiring or implying any actual such relationship or order. Where context permits, reference to a component, an integer or step (or the like) is not to be construed as being limited to only one of that component, integer, or step, but rather could be one or more of that component, integer or step.

The above description relating to embodiments of the present invention is provided for purposes of description to one of ordinary skill in the related art. It is not intended to be exhaustive or to limit the invention to a single disclosed embodiment. As mentioned above, numerous alternatives and variations to the present invention will be apparent to those skilled in the art from the above teaching. Accordingly, while some alternative embodiments have been discussed specifically, other embodiments will be apparent or relatively easily developed by those of ordinary skill in the art. The invention is intended to embrace all modifications, alternatives, and variations of the present invention that have been discussed herein, and other embodiments that fall within the spirit and scope of the above described invention.

It will be understood that the invention disclosed and defined in this specification extends to all alternative combinations of two or more of the individual features mentioned or evident from the text or drawings. All of these different combinations constitute various alternative aspects of the invention.

As used herein, except where the context requires otherwise, the term "comprise" and variations of the term, such as "comprising", "comprises" and "comprised", are not intended to exclude further additives, components, integers or steps.

PARTS LIST

1 - Closure assembly
2 - Door
4 - Closure arm
6 - Controller
8 - Drive belt
9 - Track
10 - Trolley
100 - Trolley body
110 - Guiding surfaces
112 - Lower guiding surface
114 - Inclined guiding surface
116 - Upper guiding surface
118 - Transverse guiding surface
120 - Annular support boss
122 - Support boss tubular bore
130 - Shuttle receiving portion
132 - Shuttle bore
140 - Closure arm attachment
150 - Lever aperture
160 - Stop
200 - Rotating body
201 - Rotational central axis
202 - Camming surfaces
204 - Position indicating surfaces (engaged)
205 - (Green) indicia
206 - Position indicating surfaces (disengaged)
207 - (Red) indicia
208 - Rotating body throughbore
212 - Lower surfaces
214 - Inclined surfaces
216 - Upper surfaces
218 - First transverse surfaces
220 - Intermediate lower surfaces (offset setting surfaces)
222 - Second transverse surfaces
230 - Body camming surfaces
232 - Lower body surfaces
234 - Inclined body surfaces
236 - Upper body surfaces
238 - Transverse body surfaces
300 - Lever
310 - Lever camming surfaces
312 - Lower lever surface
314 - Inclined lever surfaces -continued

| PARTS LIST |
| --- |
| 316 - Upper lever surfaces |
| 318 - Transverse lever surfaces |
| 320 - Lever bore |
| 321 - Annular projection |
| 326 - Spring location notch |
| 330 - Lever end portion |
| 332 - Release member attachment |
| 334 - End stop portion |
| 400 - Engagement assembly |
| 410 - Spring |
| 420 - End plate |
| 430 - Engagement member |
| 440 - Retaining clip |
| 500 - Release member |
| 600 - Shuttle |
| Additional features particular to second embodiment |
| 142' - Connection to closure arm bracket |
| 550' - Track latching lever |
| 170' - Lever boss formation |
| 172' - Lever pivot pin |
| 174' - Lever pivot axis |
| 176' - Lever return spring |
| 552' - Blind hole (for end of lever return spring) |
| 554' - Lever outboard end |
| 556' - Lever dog-leg portion |
| 558' - Lever inboard end |
| 559' - Upper face (cam follower) |
| 560' - Lateral tab |
| 562' - Tab wing portions |
| 564' - Hook |
| 602' - Shuttle raised end portion |
| 604' - Ramp |
| 610' - Blind long slot |
| 580' - Latch stop means |
| 582' - Top latch plate |
| 583' - Restraining edge |
| 584' - Bottom clamping plate |
| 586' - Bolts |
| 588' - Front lip |
| 590' - Upper leading latch ramp |
| 583' - Rear restraining edge |
| 555' - Ramp edge of hook |

The invention claimed is:

1. A device for a track- or rail-mounted closure drive assembly configured to be driven by a motor, the device comprising:

a lever and cam arrangement including a lever, the lever and cam arrangement configured to drive an engagement member between an engaged position and a disengaged position, the engaged position allowing drive of a closure by the motor, the disengaged position disconnecting the motor from the closure; and a rotating body separate from the lever, the lever being able to rotate with respect to the rotating body, the rotating body including one or more camming surfaces and one or more peripheral surfaces;

wherein:

operation of the lever is configured to cause rotation of the rotating body by way of the one or more camming surfaces, rotation of the rotating body is configured to drive movement of the engagement member by way of the one or more camming surfaces, and the peripheral surfaces include visual indicia to indicate to a user an orientation of the one or more camming surfaces and hence whether the engagement member is in the engaged position or the disengaged position.

2. The device of claim 1, wherein:

the one or more camming surfaces of the rotating body include different profile sections angularly separated from each other, each section having a profile associated with an axial position of the rotating body, the axial position corresponding to whether the engagement member is in the engaged position or the disengaged position, and an angular positioning of the peripheral surfaces corresponds to an angular positioning of the different profile sections of the one or more camming surfaces of the rotating body.

3. The device of claim 1, further comprising a release member associated with the lever of the lever and cam arrangement, manipulation of the release member causing rotation of the rotating body and driving movement of the engagement member by way of the one or more camming surfaces.

4. The device of claim 3, wherein the release member is a pull cord.

5. The device of claim 1, wherein the visual indicia include one or more colors on the peripheral surfaces configured to indicate to a user whether the engagement member is in the engaged position or the disengaged position.

6. The device of claim 1, further comprising a moveable trolley associated with the closure, the trolley configured for movement along the track or rail under drive by a drive component to move the closure between an open position and a closed position, the lever and cam arrangement mounted to the trolley including a body having a guiding surface, wherein the trolley defines an aperture through which a user positioned below the trolley can view the visual indicia on the peripheral surfaces of the rotating body.

7. A closure drive assembly comprising:

the device of claim 1;

a drive motor unit incorporating the motor; and a drive arrangement actuated by the drive motor unit, the drive arrangement configured to drive the closure with the motor.

8. A closure assembly comprising:

a closure mounted to move between an open position and a closed position; and the closure drive assembly of claim 7.

9. The device of claim 1, wherein the rotating body is arranged to rotate in only one direction during operation of the device.

10. The device of claim 1, wherein the rotating body defines an indexed ratchet guiding surface comprising an angularly spaced succession of ramp and stop portions.

11. A device for a track- or rail-mounted closure drive assembly, the device comprising:

a moveable trolley associated with a closure, the trolley configured for movement along the track or rail under drive by a drive component to move the closure between an open position and a closed position;

an engagement member arranged to provide selective engagement between the trolley and the drive component;

a mechanism configured to move the engagement member between an engaged position and a disengaged position, the engaged position allowing drive of the closure by way of the drive component, the mechanism having a user actuation means for manipulation by a user; and a latch configured to latch the trolley to the track or rail when it is in a position associated with the closed position of the closure, the latch moveable between a latched position and an unlatched position under operation of the mechanism, such that manipulation of the user actuation means to move the engagement member into the disengaged position also has the effect of moving the latch into the unlatched position, wherein the mechanism includes a rotating body with camming surfaces provided on a periphery of the rotating body and arranged to engage with an element associated with the latch and to move the latch between the latched position and the unlatched position.

12. The device of claim 11, wherein the latch is biased into the latched position with a biasing element.

13. The device of claim 12, wherein the biasing element is a spring.

14. The device of claim 11, wherein the rotating body is provided with further camming surfaces on axial surfaces of the rotating body, the further camming surfaces configured to cooperate with other components of the mechanism to drive the movement of the engagement member between the engaged position and the disengaged position.

15. The device of claim 11, wherein the rotating body further includes peripheral circumferentially opposing lobes, such that for each successive 90° rotation of the rotating body the latch is configured to alternate between the latched position and the unlatched position.

16. The device of claim 11, wherein the latch further comprises a substantially horizontal lever mounted for pivoting movement around a lever axis on the trolley, the lever including a hook portion to engage, when the latch is in the latched position, with a latch stop on or mounted to the track or rail.

17. The device of claim 16, wherein the drive component includes an element having a shaping which, when the drive component is operated, interacts with a part of the lever to move the latch into the unlatched position, irrespective of the orientation of the rotating body.

18. The device of claim 11, further comprising a lost motion arrangement configured so that, when the drive component operates in order to move the trolley along the track or rail to move the closure between a closed and an open position, the latch is automatically moved between the latched position and the unlatched position.

19. A closure drive assembly comprising:

the device of claim 11;

a drive motor unit; and a drive arrangement actuated by the drive motor unit, the drive arrangement including the drive component.

20. A closure assembly comprising:

a closure mounted to move between an open position and a closed position; and the closure drive assembly of claim 19.

* * * * *